United States Patent [19]

Kirk et al.

[11] 4,297,219
[45] Oct. 27, 1981

[54] TEMPORARY STREAM FILTRATION SYSTEM

[75] Inventors: Joseph R. Kirk, Findlay; Edward C. Campbell, Forest, both of Ohio

[73] Assignee: The KBI Corp., Findlay, Ohio

[21] Appl. No.: 115,991

[22] Filed: Jan. 28, 1980

[51] Int. Cl.³ .............................................. B01D 35/02
[52] U.S. Cl. ................................... 210/669; 210/155; 210/255; 210/300
[58] Field of Search ............... 210/27, 40, 73 R, 73 S, 210/154, 155, 162, 170, 255, 259, 261, 262, 265, 266, 282, 284, 299–301, 305, 307, 317, 320, 335, 470, 502, 663, 669, 806

[56] References Cited

U.S. PATENT DOCUMENTS

| | | | |
|---|---|---|---|
| 671,685 | 4/1901 | Xander | 210/170 |
| 799,180 | 9/1905 | McClintock | 210/255 |
| 799,829 | 9/1905 | Church | 210/162 |
| 802,183 | 10/1905 | Durbrow | 210/170 |
| 815,722 | 3/1906 | Lydon | 210/154 |
| 2,746,297 | 5/1956 | Martin | 210/470 |
| 3,464,920 | 9/1969 | Pirson et al. | 210/40 |
| 3,890,225 | 6/1975 | Kajiyama | 210/32 |
| 4,134,831 | 1/1979 | Dawson et al. | 210/33 |

Primary Examiner—Ivars C. Cintins
Attorney, Agent, or Firm—Hugh Adam Kirk

[57] ABSTRACT

An apparatus constructable in situ for filtering pollutants from a flowing creek or stream, comprising one or more adjacent and/or cascaded flume-type boxes supported by the stream bed, each of which boxes comprises parallel sides, top and bottom spacers, at least one upwardly sloping ramp between the sides to form a weir edge, and one or more replaceable porous trays containing a filtering or pollutant-removing medium located directly beneath the weir edge. A slotted cover for the trays uniformly distributes the stream's contaminated water over and onto the filtering medium and a screen bottom for the trays retains the filter medium therein. The apparatus is positioned in the stream so that all the water in the stream will flow into the box or boxes, up the ramp, over the weir edge or edges, and downwardly through the filter trays before resuming its course along the stream bed. A plurality of adjacent boxes may be installed across wider streams, and gates may be provided for shutting off one or more boxes when the flow in the stream decreases.

19 Claims, 6 Drawing Figures

U.S. Patent  Oct. 27, 1981  Sheet 1 of 3  4,297,219
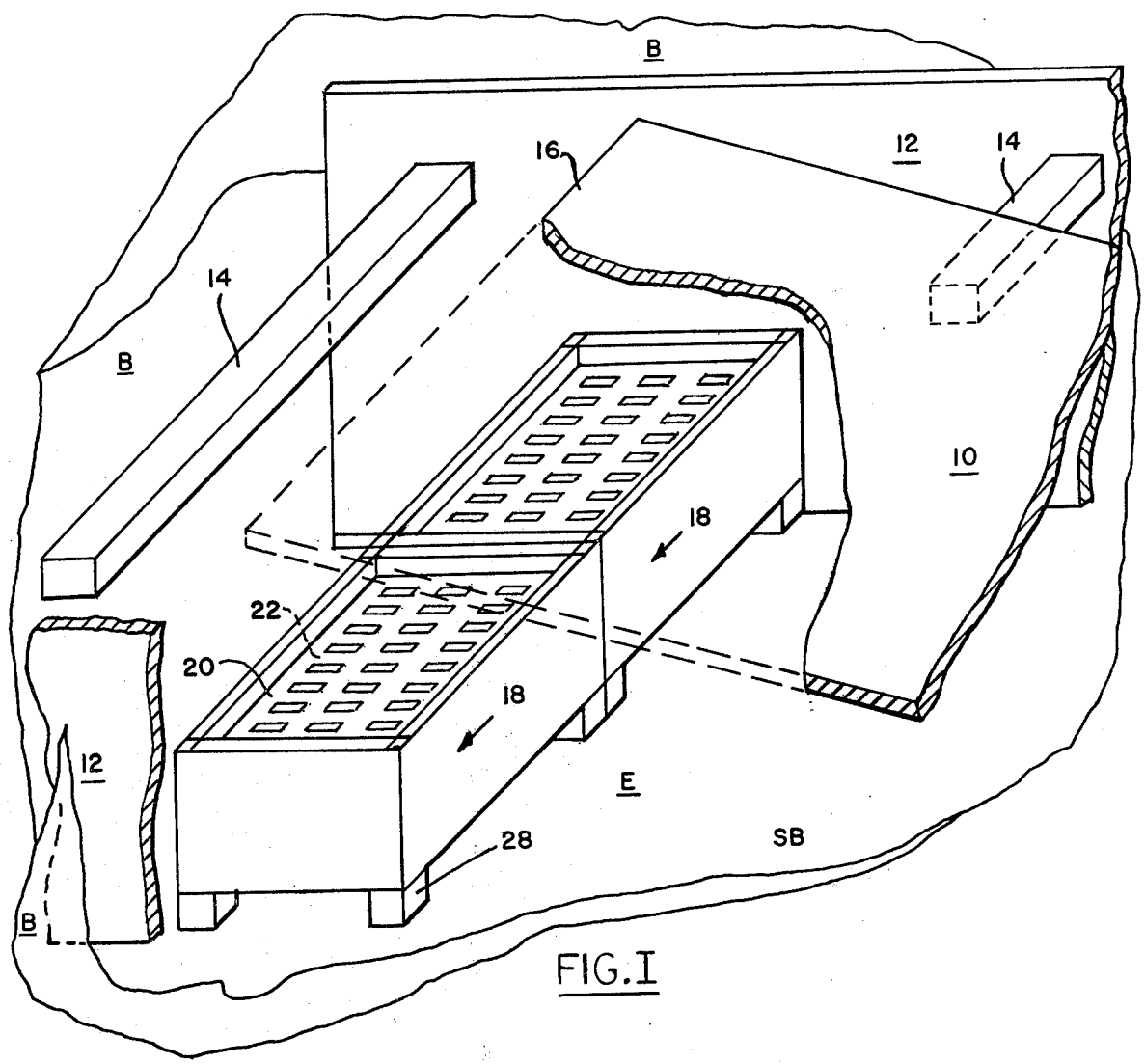
FIG. I
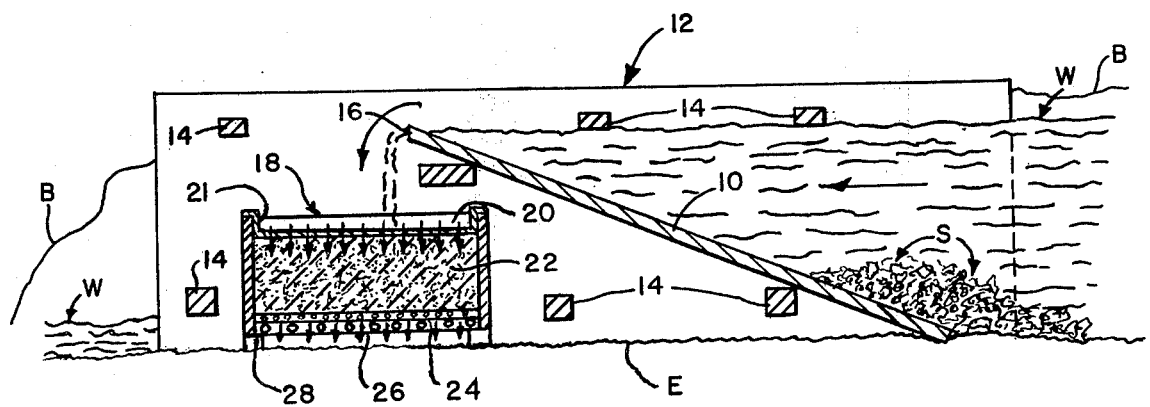
FIG. II

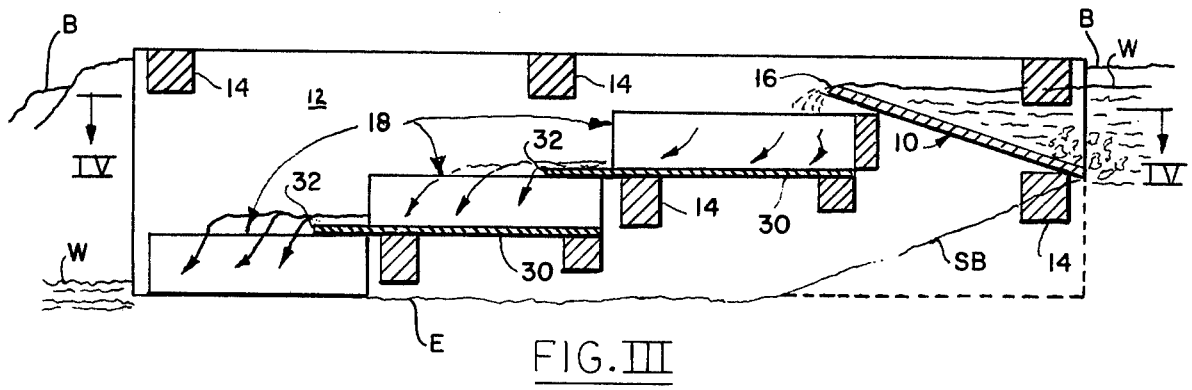
FIG. III
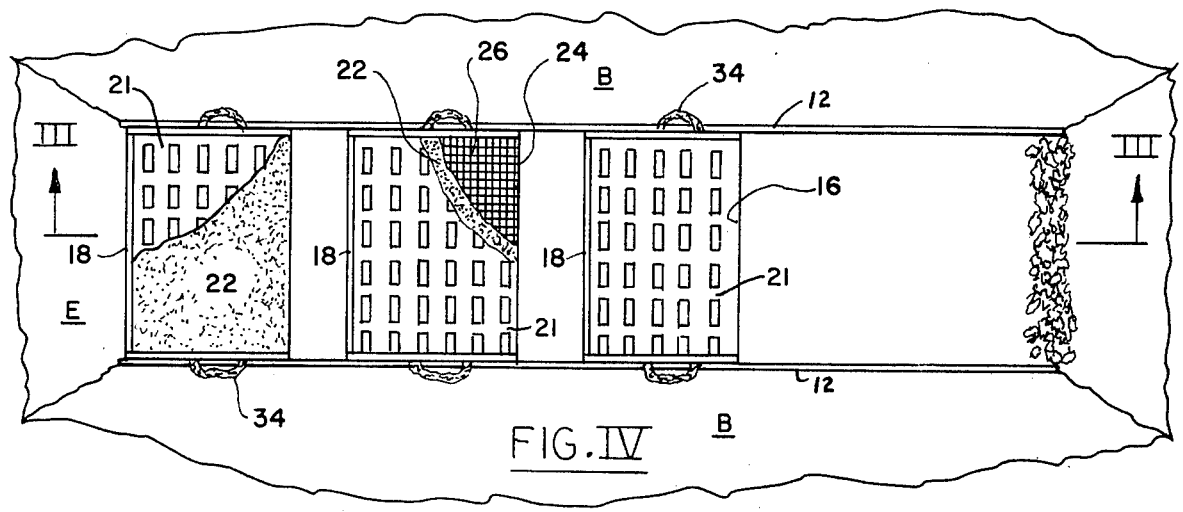
FIG. IV
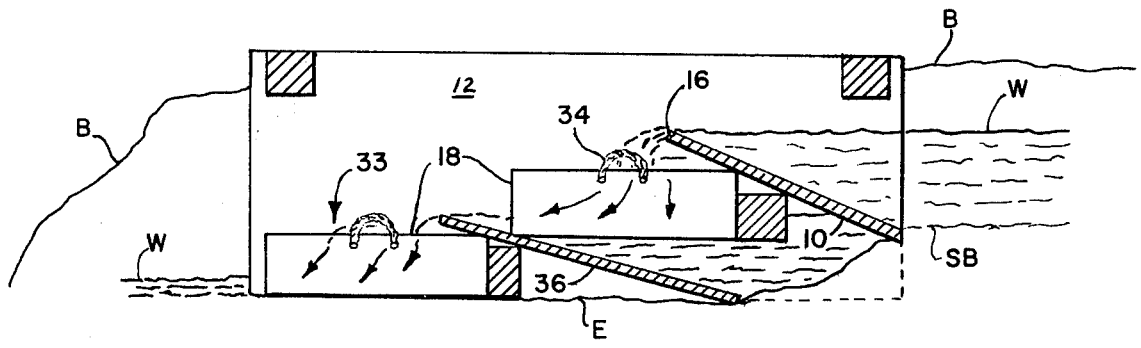
FIG. V

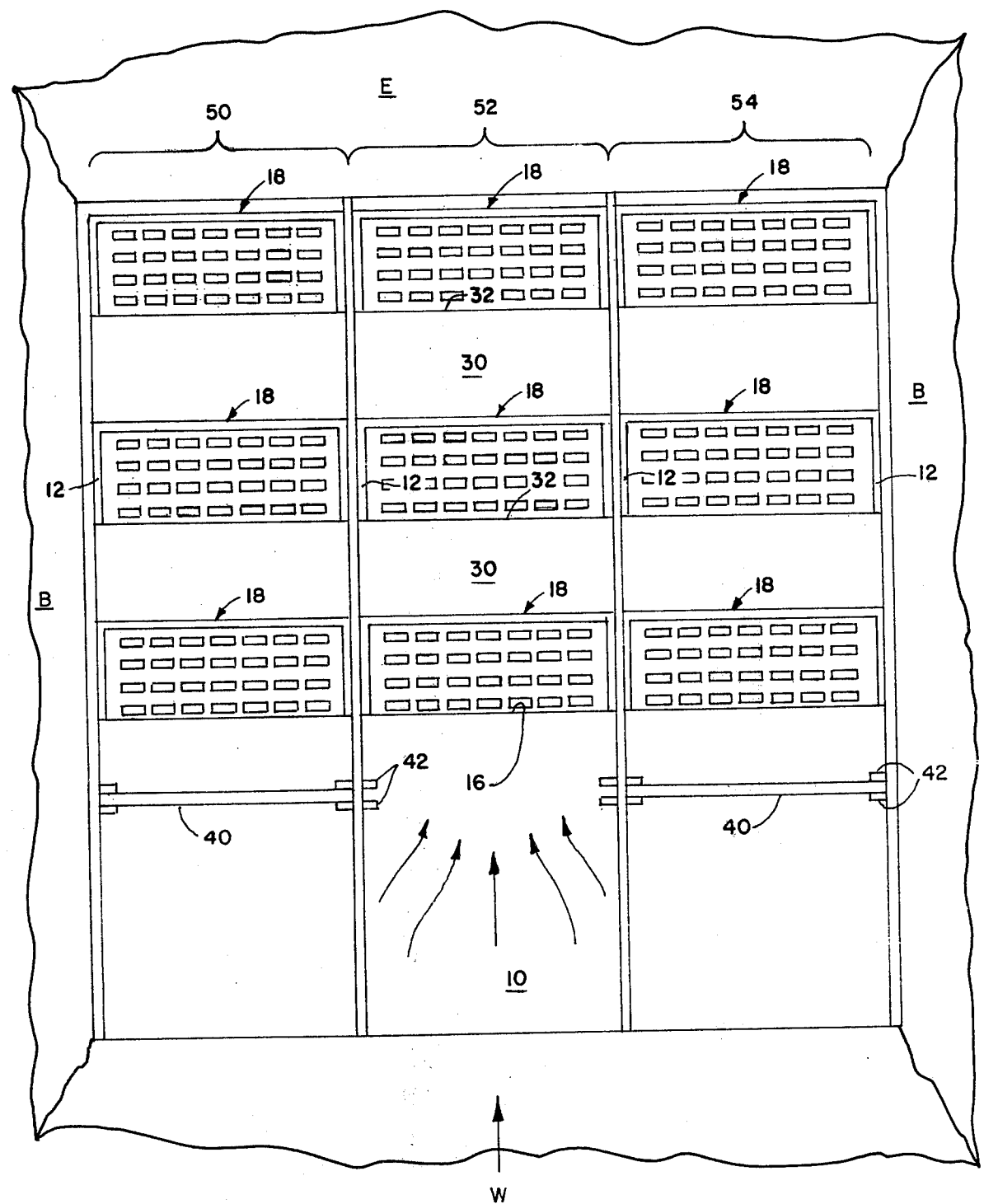
FIG. VI

TEMPORARY STREAM FILTRATION SYSTEM

BACKGROUND OF THE INVENTION (1) Field of Invention—Water Decontamination
(2) Description of Prior Art A major problem in removing unwanted contamination due to spills from our free-flowing streams and creeks is the nature of the many different kinds of contaminants which can occur and already are present in the streams. These contaminants range in size from large floating leaves and twigs, to smaller yet heavier plant seeds, to silt, rocks and solids, to partially decomposed organic matter, to floating oil and to chemicals in suspension or solution.

Previous systems for the separation of contaminants from flumes and streams have employed a variety of screens, ramps, weirs, separators, filters and skimmers in different combinations depending on the contaminant to be removed. Some of such systems as shown in the following patents:

| Group I - Flumes with Weirs and Filters | | | |
|---|---|---|---|
| Xander | 671,685 | Apr. 9, 1901 | 210-170 |
| Heller | 1,477,660 | Mar. 6, 1923 | 210-162 |
| Cavenah et al | 2,844,255 | July 22, 1958 | 210-170 |
| Kinne | 3,282,430 | Nov. 1, 1966 | 210-170 |
| Jones | 3,850,807 | Nov. 26, 1974 | 210-170 |
| Group II - Flumes with Ramps and Filters | | | |
| Blake | 636,747 | Nov. 14, 1899 | 210-162 |
| Church | 799,829 | Sept. 19, 1905 | 210-162 |
| Yordy | 1,290,470 | Jan. 7, 1919 | 210-154 |
| Van Duzer | 2,669,197 | Feb. 16, 1954 | 210-162 |
| Wait | 2,055,808 | Sept. 29, 1936 | 210-170 |
| Group III - Flume with Ramp and Weir | | | |
| Michel et al | 3,817,383 | June 18, 1974 | 210-305 |
| Group IV - Flumes with Upflow Non-Clogging Separators | | | |
| Cowley | 95,089 | Sept. 21, 1869 | 210-154 |
| Durbrow | 802,183 | Oct. 17, 1905 | 210-154 |
| Durbrow | 832,245 | Oct. 2, 1906 | 210-170 |
| Hurst | 1,451,394 | Apr. 10, 1923 | 210-162 |
| Perkins | 3,854,291 | Dec. 17, 1974 | 210-170 |

A system designed to remove oil from the surface of a stream, such as shown in the above listed Jones U.S. Pat. No. 3,850,807, will, by its very nature, allow heavier particulate matter and dissolved chemicals to remain in the stream. Similarly, screens set up to trap large particulate matter, such as leaves, twigs, paper, or fine mesh sack to strain out weed seeds, such as shown in the above listed Kinne U.S. Pat. No. 3,282,430, will have little effect on chemical pollutants.

As the screen mesh gets finer or when filters using activated charcoal or other chemical reactants are employed, another problem develops. These filters can become clogged by larger particulate matter very rapidly, resulting in inefficient filtering, loss of time in cleaning the filter, and additional expense.

Often complex filtration systems require a permanent structure, usually constructed of masonry or a similar material, such as shown in the above listed patents to Xander U.S. Pat. No. 671,685, Wait U.S. Pat. No. 2,055,808, and Perkins U.S. Pat. No. 3,854,291, in which time for construction is long and the expense involved is high.

SUMMARY OF THE INVENTION

This invention comprises a weir box with an inclined ramp acting as a weir, and one or more filter trays placed directly below the raised edge of the ramp. As the stream water flows against the ramp, heavier particulate material will settle out near the bottom of the ramp, while the remainder of the water flows up and over the weir edge, and into the filter trays. The filter material contained in the trays can be activated carbon, peat moss, limestone, or any other chemical used in neutralization, filtration, adsorption, absorption, or ion exchange. A slotted or perforated cover on the filter trays will distribute the water evenly over the filter medium, thus preventing channelization. These filter trays can have handles, such as of rope, to permit easy removal and replacement when contaminated. The retention time of water in the filter trays can be increased, thus increasing filtering efficiency, by arranging a plurality of filter trays in a staggered fashion, allowing the stream to cascade from one tray to the next. When larger volume streams are to be decontaminated, a plurality of parallel weir boxes of filter trays may be placed in parallel rows, and gates may be provided for each row for blocking off those rows of boxes not needed when the flow in the stream is reduced.

The entire apparatus is usually made of wood so that it can be easily transported and assembled in situ. With the aid of a tractor with a backhoe the stream bed can be formed around the box or boxes so that all of the stream will pass through them.

OBJECTS AND ADVANTAGES

It is an object of this invention to produce in situ an efficient, simple, effective, economic and temporary filtering apparatus for removing pollutants including dissolved and organic pollutants and contaminants from a free-flowing stream.

It is another object of this invention to provide such a filtering apparatus which is not clogged by sediments and particulates from the stream.

It is yet another object of this invention to provide such a filtering apparatus made of wood, so that it can be easily transported and assembled in situ and installed by the aid of a tractor with a backhoe.

It is still another object of this invention to provide such a filtering apparatus with removable and replaceable trays of filter medium which can be easily cleaned and recharged when contaminated, and arranged in such a fashion as to allow relatively long water retention time and to prevent channelling.

BRIEF DESCRIPTION OF THE DRAWINGS

The above mentioned and other features, objects and advantages, and a manner of attaining them are described more specifically below by reference to embodiments of this invention shown in the accompanying drawings, wherein:

FIG. I is a perspective view of a weir box according to one embodiment of the invention with parts broken away showing its replaceable filter trays;

FIG. II is a longitudinal vertical section of the weir box shown in FIG. I in position in a stream;

FIG. III is a longitudinal section taken along line III—III of FIG. IV of another embodiment of the invention showing a cascade of filter trays in a box positioned in a stream;

FIG. IV is a plan view of the cascade weir box taken along line IV—IV of FIG. III;

FIG. V is a longitudinal section similar to FIG. III of another embodiment of this invention showing a cascade weir box; and FIG. VI is a top plan view of still another embodiment of this invention showing multiple adjacent parallel weir boxes, each having a cascade of filter trays with gates for the boxes for permitting adjustment according to variations in the stream flow.

DETAILED DESCRIPTION OF THE PREFERRED EMBODIMENTS

The materials used in construction of this weir box and filter trays of this invention can be transported unassembled by truck to the stream site where they can be easily and quickly assembled with the aid usually only of a box of nails and a hammer. The unassembled parts comprise lumber or wood, slotted sheets, some wire screen, and a filter medium. The weir box of this invention may, for example, comprise a few 4×4 inch×4 feet long posts or spacers and at least three 4 foot×8 foot×1 inch thick plywood panels. The weir box is positioned lengthwise in the stream like a flume or channel, and a backhoe can be used to form the stream bed around the box, thus insuring that all of the stream flow will pass through the box. The desired filter medium is placed in one or more prefabricated frames or trays of for example about 2 feet or 4 feet long×1½ or 2 feet wide×1 foot deep or high with a screen over its open bottom to retain the filter medium and a slotted sheet or plate or tray over its top to distribute the water substantially uniformly over the open top and downwardly through the whole of the filter medium. These filter frames or trays may be fabricated previously or constructed in situ as weir boxes.

In FIG. I a plywood ramp 10 is positioned between two parallel plywood sidewalls 12 sunk into the stream bed E. Top and bottom spacers 14 prevent the sidewalls 12 from collapsing from the combined action of the stream flow and the pressure exerted by the stream banks B. These spacers also act as supports for the ramp 10. Ramp 10 is cut away to show the filter trays or frames 18 positioned directly below the weir edge 16 of the ramp 10. The number and exact position of the filter trays depends on the degree of filtering required, as well as the width and volume of the stream. FIGS. III–VI show modifications of this invention involving multiple filter trays.

Each filter tray 18 may rest on short wooden legs 28 to permit and promote fast drainage of the liquid passing downwardly through the filters. FIG. I also shows the slotted or perforated tray or cover 20 for each frame or filter tray 18. These covers 20 may have stepped flanged edges 21 (see FIG. II) to seat in and around the top edges of the frames 18 and these covers 20 are important in that they distribute the stream flow evenly over the top of the frame 18 for the filtering medium 22, thus enhancing the adsorbent qualities of the medium. Without these covers the force of the water falling from the ramp edge 16 could quickly form and/or erode a channel or channels through the filtering medium.

Preferably the filtering or pollutant-removing medium 22 is activated charcoal, although peat moss, limestone, ion exchange resins or other chemicals used in neutralization, filtration, adsorption or absorption can be used in the frames 18 depending on the contaminant in the stream to be removed.

The bottom of each tray is covered with a fine mesh screen 24 for supporting the filtering medium 22, and a course mesh screen 26 below the screen 24 may also be used for holding the fine screen 24 in place. These screens can be seen in cross-section in FIG. II and in plan in the broken-away filter medium 22 in FIG. IV.

FIG. II shows another view of ramp 10 with its base resting on the stream bed SB, and the remainder of its length being supported by the spacers 14. The ramp 10 has its upper weir edge 16 above the normal level or surface of the stream W forming the weir. As the water W flows downstream and encounters the ramp 10, heavy particulate matter, sediment, solids and stones S carried by the stream will settle out near the base of the ramp 10. The remainder of the flow will be forced up ramp 10 over the edge of the weir 16, and drop or fall into the filter tray 18. The flow is distributed evenly over the filtering medium 22 by the slotted cover tray 20. As the decontaminated or clean water leaves the filter frame 18 it passes through the two bottom screens 24 and 26 and on out between the legs 28 and continues downstream.

FIG. III shows a modification of this invention involving multiple filter trays 18. By arranging the trays in a cascade pattern, the dwell or retention time of the water in the stream in the filter frames 18 is increased, thus providing more filtering treatment. This cascade arrangement is also more efficient than stacking a plurality of trays one atop another below a weir edge 16, as well as providing easier access for their replacement.

A plywood board 30 is fastened or supported underneath each frame 18 and extends part way over the next lower frame so as to form an overflow edge 32 above and for the next lower filter frame or tray 18. The water will flow out the bottom of the first tray, along the plywood board to its edge and then out the next filter frame 18, and will continue on through each successive filter 18. This sheet 30 is shown horizontal in FIG. III; however, they may be placed as the ramp 10 at an angle as shown for the second weir ramp 36 in FIG. V.

FIG. IV shows a top plan view of filter trays arranged in a cascading fashion in FIG. III, and also shows the rope handles 34 on two opposite sides of each frame 18 for their manual replacement in the field when this filter medium becomes too contaminated and needs replacement. The filter medium in frames 18 then may be cleaned and/or recharged for reuse while spare frames with fresh, clean filter medium are immediately replaced for the removed frames 18.

FIG. VI shows still another embodiment of this invention and its adaptability to streams whose volume and/or width may be greater than one or two filter frames. In this top plan view there are shown also parallel adjacent rows 50, 52 and 54 of weir boxes, each with multiple filter frames 18 set up for three cascade rows as shown schematically in side elevation in FIG. III. A gate means 40 at the upper end of each parallel row 50, 52, 54 can be installed to direct the flow of the stream for the most efficient use of the filters as the volume of the stream may vary depending on the weather. If the normal volume of the stream is decreasing, as for instance under drought conditions, two gates 40 on either side of the three rows of filters can be closed so as to funnel the flow of the stream into the central cascade row 52. The gates 40 may be plywood panels, wooden planks, or boards placed between end-supporting columns 42 attached to sidewalls 12 of the weir boxes just before the first ramp edges 16.

While there is described above the principles of this invention in connection with specific apparati, it is to be clearly understood that this description is made only by way of example and not as a limitation to the scope of this invention.

We claim:

1. A temporary method of purifying a contaminated and polluted water stream comprising:
   (A) inserting a temporary ramp weir in the stream,
   (B) forming an earth dam across said stream on each side of said ramp weir to form a dam so that all the water in said stream is caused to flow down over the weir edge of said ramp to form a falling path,
   (C) positioning replaceable frames of sorbent filter material in said falling path of water from said weir whereby said ramp catches the sediment in said stream at its lower end and said filter material removes chemical contaminants and pollutants from said stream that flows over said weir edge, and
   (D) removing said frame and said ramp weir from the stream after the stream water is purified.

2. A temporary method of purifying according to claim 1 comprising a plurality of adjacent ramp weirs.

3. A temporary method of purifying according to claim 2 wherein said adjacent ramp weirs are positioned successively in cascade.

4. A temporary method of purifying according to claim 2 wherein said adjacent ramp weirs are positioned side by side.

5. A temporary method of purifying according to claim 4 including the step of gating each side-by-side ramp weir to compensate for variable volumes of water in the stream.

6. A temporary apparatus for purifying a contaminated and polluted liquid stream, said apparatus comprising:
   (A) a pair of parallel plywood sidewalls,
   (B) brace means for maintaining the spacing between said sidewalls including a plywood ramp between said sidewalls extending from the bottom of said sidewalls to below the top edges of said sidewalls to provide a weir edge at the top end of said ramp, and
   (C) replaceable filter frame means placed between said sidewalls vertically below said weir edge of said ramp whereby the liquid in the stream passes over said weir edge and falls downwardly through said frame means, said frame means comprising:
      (a) rectangular sidewalls,
      (b) a perforated cover for distributing the liquid from said weir edge uniformly over the top of said frame means,
      (c) a contaminant and pollutant-removing sorbent medium inside said sidewalls,
      (d) screen means over the bottom of said frame means to retain said medium, and
      (e) supporting leg means to provide a space below said rectangular sidewalls to permit escape of said liquid from below said frame means.

7. An apparatus according to claim 6 wherein said sorbent medium comprises activated charcoal.

8. An apparatus according to claim 6 wherein said sorbent medium comprises peat moss.

9. An apparatus according to claim 6 wherein said sorbent medium comprises limestone particles.

10. An apparatus according to claim 6 wherein said sorbent medium comprises an ion exchange composition.

11. An apparatus according to claim 6 wherein said screen means comprises a fine mesh backed by a large mesh screen screen which supports said fine mesh screen.

12. An apparatus according to claim 6 wherein said sorbent medium is replaceable with fresh medium.

13. An apparatus according to claim 6 wherein a multiplicity of said frame means are placed in a cascade arrangement permitting a longer dwell time for the liquid in the sorbent.

14. An apparatus according to claim 13 wherein each frame means has a plywood floor for supporting said leg means, and said floor has a weir edge which conveys the filtered liquid from an upper frame means over its said weir edge and on to the next lower frame means of said cascade.

15. An apparatus according to claim 14 comprising a multiplicity of parallel cascades each cascade having a gate means at its uppermost weir edge.

16. An apparatus according to claim 15 wherein said gate means comprises a vertical rectangular plywood plank and vertically extending parallel slots on said parallel side walls for slidably seating the parallel vertical edges of said plank.

17. An apparatus according to claim 6 comprising a plurality of parallel apparati.

18. An apparatus according to claim 17 including separate gate means for each of said parallel apparatus.

19. An apparatus according to claim 6 wherein said frame means has handle means for its easy replacement.

* * * * *

UNITED STATES PATENT AND TRADEMARK OFFICE
CERTIFICATE OF CORRECTION

PATENT NO. : 4,297,219
DATED : October 27, 1981
INVENTOR(S) : Joseph R. Kirk et al It is certified that error appears in the above-identified patent and that said Letters Patent are hereby corrected as shown below:

Column 1, line 26, change "1,477,660" to -- 1,447,660 --. Column 3, line 67, change "course" to -- coarse --. Column 6, line 21, after "mesh" insert -- screen --.

Signed and Sealed this

Twenty-third Day of February 1982

[SEAL]

Attest:

*Attesting Officer*

GERALD J. MOSSINGHOFF
*Commissioner of Patents and Trademarks*